Patented Sept. 17, 1946

2,407,953

UNITED STATES PATENT OFFICE 2,407,953

TACKY RUBBERLIKE COMPOSITIONS AND METHOD OF MAKING THE SAME

Robert R. Dreisbach, Edgar C. Britton, and Walter J. Le Fevre, Midland, Mich., assignors to The Dow Chemical Company, Midland, Mich., a corporation of Michigan No Drawing. Application July 16, 1943, Serial No. 495,028

8 Claims. (Cl. 260—42)

This invention concerns a method whereby certain rubber-like polymeric products which are non-tacky, or substantially so, may be rendered tacky by treatment with substances which are themselves rubbery and vulcanizable. It also concerns the resultant tacky rubber-like compositions and the non-tacky rubbery products obtained by vulcanizing the same.

Non-tacky rubber-like polymeric products which may be given tack in accordance with the invention are the subject matter of a co-pending application of R. R. Dreisbach, Serial No. 423,295, filed December 17, 1941. They are copolymers of an aliphatic conjugated diolefine, a 2-aryl-1-alkene and an alpha-beta unsaturated ketone having the general formula:

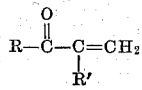

wherein R represents an alkyl radical and R' represents hydrogen or an alkyl radical. The non-tacky rubber-like products are preferably prepared by polymerizing together between 37 and 65 per cent by weight of an aliphatic conjugated diolefine, between 20 and 60 per cent of such ketone and between 1 and 30 per cent of a 2-aryl-1-alkene, since, when vulcanized, the products of this composition are highly resistant to abrasion. However, the starting materials may be co-polymerized in other proportions to obtain non-tacky rubbery co-polymers which may be rendered tacky by the present method. Examples of aliphatic conjugated diolefines which may be employed in the polymerization reaction are butadiene-1.3, isoprene and 2.3-dimethyl-butadiene-1.3, etc. Among the various unsaturated ketones which may be employed as starting materials are methyl vinyl ketone, ethyl vinyl ketone, isopropyl vinyl ketone, methyl isopropenyl ketone, ethyl isopropenyl ketone, etc. Examples of 2-aryl-1-alkenes which may be used in preparing the non-tacky co-polymers are styrene, alpha-methyl-styrene, para-chloro-styrene, ortho-chloro-styrene, para-methyl-styrene, para-methyl-alpha-methyl-styrene, ortho-ethyl-styrene and meta-ethyl-styrene, etc. Any set of these three types of polymerizable compounds may be used in making the non-tacky rubber-like co-polymers.

The co-polymerization reaction may be carried out in any of the usual ways, e. g. in the presence or absence of solvents or liquid diluents, but it is advantageously carried out in an aqueous emulsion of the polymerizable compounds and a minor amount of a peroxide catalyst. As the peroxide catalyst, a persulphate, e. g. ammonium, sodium, or potassium persulphate, is preferably used, but other peroxides such as hydrogen peroxide, or sodium peroxide, etc., may be employed. The peroxide is usually employed in a proportion corresponding to between 0.5 and 2 per cent of the combined weight of the polymerizable compounds, but it may be used in other proportions if desired. The emulsion is usually prepared so as to contain a total of from 10 to 50, preferably from 35 to 48, per cent of the polymerizable compounds and the peroxide in the proportion just mentioned. A small proportion of an alkali, e. g. sodium or potassium carbonate or a corresponding hydroxide, is usually added to render the mixture somewhat alkaline. Any of a variety of well-known emulsifying agents, e. g. the alkali metal sulphonates of aliphatic or alkyl aromatic hydrocarbons of high molecular weight, may be used in preparing the emulsion.

The emulsion is warmed in a closed container to a temperature between 30° and 100° C., preferably between 50° and 70° C., to effect the polymerization. The reaction is substantially complete after from 10 hours to 3 days of heating.

The co-polymer product may be recovered from the emulsion in any of the usual ways, e. g. by freezing or by adding coagulating agents such as acids or water-soluble salts, etc. In practice it is usually coagulated by adding an aqueous solution of calcium chloride or barium chloride. The product is washed with water and dried, preferably under vacuum.

The non-tacky rubber-like product thus obtained is readily compounded with carbon black, sulphur, accelerating agents, fillers and other usual rubber-compounding agents and cured to obtain a vulcanized rubbery product having good mechanical properties, e. g. a high tensile strength, good elasticity, and a high per cent elongation value before breakage occurs, etc., and which is exceptionally resistant to wear by abrasion. However, due to the fact that the uncured co-polymer possesses little or no tackiness, it does not adhere well to the fabrics, e. g. of cotton or rayon, which are used in the construction of tires, hoses, rubber belting, etc.

Treatment of the uncured co-polymer with organic resins or plasticizing agents such as are sometimes used to render other kinds of rubber tacky, usually either fails to impart tackiness to the co-polymer, or weakens or otherwise impairs its quality. Such resins and plasticizers are in most, if not all, instances non-rubbery materials which cannot be vulcanized. The incorporation of such substances in a rubber amounts to diluting the latter.

According to the present invention, such non-tacky rubber-like co-polymer of a conjugated diolefine, a 2-aryl-1-alkene and an unsaturated ketone is rendered tacky by incorporating therewith between 5 and 25, and preferably between 8 and 20, per cent by weight of a tacky co-polymer of a diolefine, a 2-aryl-1-alkene and an unsaturated ketone having the general formula hereinbefore mentioned, which tacky co-polymer may be prepared as described in a co-pending application of E. C. Britton and W. J. LeFevre, Serial No. 494,922, filed concurrently herewith. Peculiarly, although the non-tacky type of co-polymer may be rendered tacky by mixing from 5 to 25 per cent of the tacky co-polymer therewith, the addition of a larger proportion of the tacky co-polymer often fails to yield a tacky mixture. Also, the use of more than 25 per cent of the tacky co-polymer may result in weakening of the vulcanized rubbery mixture. It should be mentioned that the tacky type of co-polymer is itself somewhat rubbery and that it may be vulcanized to produce a rubber-like product. Accordingly, incorporation of the tacky type of co-polymer with the non-tacky co-polymer does not involve dilution of the final rubbery product.

The tacky type of co-polymers preferably employed in the process are those composed of from 37 to 65 per cent by weight of an aliphatic conjugated diolefine, from 20 to 60 per cent of an unsaturated ketone and from 1 to 30 per cent of a 2-aryl-1-alkene. However, tacky co-polymers of such polymerizable compounds in other proportions may, in some instances, be used. Examples of a number of diolefines, unsaturated ketones and 2-aryl-1-alkenes which may be used in preparing the tacky co-polymers have hereinbefore been given with reference to the preparation of the non-tacky type of co-polymer and need not be repeated. The tackiness of a co-polymer is dependent, not only on its composition, but also upon the conditions under which it is prepared.

In preparing the tacky type of co-polymer, the above-mentioned polymerizable compounds in the proportions stated are polymerized while in an aqueous emulsion which is of a pH value below 3 and which contains an iron salt, e. g. ferric chloride, ferric nitrate, ferric sulphate, or ferric acetate, etc., and which also contains a peroxide throughout the major portion, and preferably the entire, reaction period. The ferric salt need not be added as such, but may be formed in situ, e. g. by oxidation of a corresponding ferrous salt. Hydrogen peroxide is preferably used as the peroxide ingredient of the mixture, but other peroxides, e. g. sodium peroxide, barium peroxide, or an alkali metal or an ammonium persulphate, etc., may be employed. Any of the well-known emulsifying agents capable of forming stable acidic emulsions may be used in preparing the emulsion. Nopco (a sodium salt of sulphonated sperm oil) is preferred.

The polymerization is carried out by heating the emulsion in a closed container at temperatures between 50° and 150° C., preferably between 60° and 100° C., until the polymerization is largely, but not entirely, complete, e. g. until from 80 to 95 per cent by weight of the polymerizable compounds have reacted. Usually from 15 minutes to 1 hour of heating are sufficient to complete the polymerization to this point. The progress of the polymerization reaction may be followed by observing the vapor pressure of the reaction mixture. It is important that the reaction be stopped slightly short of completion, since the final 5 per cent or so of the diolefine, if polymerized, may render the product non-tacky.

It should be mentioned that when employing this combination of reaction conditions, the tackiness of the product tends to increase with increase in the iron salt content of the emulsion. However, when the proportion of the iron salt is increased, e. g. above 200 parts by weight of iron per million parts of the polymerizable compounds, the rate of decomposition of the peroxide becomes quite rapid and it becomes increasingly difficult to maintain a peroxide in the emulsion throughout the polymerization reaction. For these reasons, the iron salt is usually employed in a proportion such as to contain from 10 to 100 parts by weight of iron per million parts of the compounds to be polymerized, but it may be used in smaller or in larger porportions.

The tacky type of co-polymer and the non-tacky co-polymer are mixed in proportions such that the resulting mixture contains from 5 to 25, preferably from 8 to 20, per cent by weight of the tacky co-polymer, based on the combined weight of these ingredients. The mixing may be accomplished in any of the usual ways, e. g. by mixing the aqueous emulsions of the two types of co-polymers and simultaneously coagulating the co-polymers from the resultant mixture, or by separately coagulating each type of co-polymer from the emulsion in which it is formed and thoroughly mixing the co-polymers on compounding rolls or in other ways. In either case a small proportion, e. g. 0.5 to 2 per cent, of a rubber antioxidant, such as phenyl-beta-naphthylamine, di-(p-hydroxy-phenyl)-cyclohexane, Antox (i. e. a condensation product of aniline and butyraldehyde), or Thermoflex (i. e. p.p'-dimethoxy-diphenylamine), etc., may advantageously be added to the emulsion, or emulsions, prior to coagulating the co-polymers so as to protect the latter against oxidation by air.

The tacky rubber-like mixture of co-polymers when compounded with usual rubber-compounding agents, e. g. carbon black, sulphur, anti-oxidants, vulcanization accelerators, plasticizing agents, fillers, etc., produces a tacky mixture suitable for curing. However, upon curing the latter mixture, a non-tacky rubbery final product is obtained. The vulcanized final product possesses good mechanical properties such as a high tensile strength, a high per cent elongation value, good elasticity and excellent resistance to wear by abrasion. Prior to, or during, vulcanization of the product, i. e. while it is in the tacky condition, it may be applied in any of the usual ways to fabrics of cotton, rayon, or other materials, to obtain a good bond. After being vulcanized, the rubber-like product, which no longer is tacky, remains firmly bonded to the fabric.

The following examples illustrate certain ways in which the principle of the invention has been applied, but are not to be construed as limiting its scope.

EXAMPLE 1

An aqueous emulsion was prepared which contained 120 grams of butadiene-1.3, 120 grams of methyl isopropenyl ketone, 60 grams of styrene, 2.5 kilograms of water, 30 grams of Nopco (a sodium salt of sulphonated sperm oil), 7.8 grams of hydrogen peroxide ($H_2O_2$), 0.1 gram of ferric nitrate, $Fe(NO_3)_3 \cdot 9H_2O$, i. e. an amount of ferric nitrate corresponding to 46 parts by weight of iron per million parts of the polymerizable compounds, and sufficient nitric acid to give the emulsion a pH value of 2. The emulsion was heated with agitation in a closed container at 90° C. for 18 minutes, at the end of which time about 90 per cent of the mixture of butadiene, methyl isopropenyl ketone and styrene initially employed had been polymerized. The product was coagulated by adding sodium chloride to the emulsion, The product thus precipitated was separated from the liquor, washed with water and dried by warming the same at about 60° C. under vacuum. It is an extremely tacky soft solid which is capable of flowing gradually on long standing. It is capable of being elongated considerably before breaking, is somewhat though not highly elastic, and is readily soluble in cyclohexanone. It is capable of being vulcanized to form a non-tacky, elastic rubbery material.

canized to form a firm bond with the latter. The compounded material was rolled into a sheet and cured by heating under pressure at 148° C. for 20 minutes. Standard test strips cut from the cured sheets were used to determine the tensile strength and the per cent elongation proportion of the products, as described in A. S. T. M. D412–39T and also to determine the Shore durometer hardness. These properties of the compounded and cured products are also given in the table.

*Table I*

| Run No. | Co-polymers mixed | | Uncured compounded mass | Properties of cured product | | |
|---|---|---|---|---|---|---|
| | Percent tacky co-polymer | Percent nontacky co-polymer | | Tensile strength lbs./sq. in. | Percent elongation | Hardness |
| 1 | 0 | 100 | Non-tacky | 2,660 | 430 | 60 |
| 2 | 9 | 91 | Tacky | 2,400 | 570 | 56 |
| 3 | 17 | 83 | Very tacky | 2,550 | 570 | 50 |
| 4 | 23 | 77 | Slightly tacky. | 1,420 | 390 | 56 |

Example 2

3.2 parts by weight of butadiene-1.3, 3.2 parts of methyl isopropenyl ketone and 1.6 parts of styrene were admixed with 1.5 parts of an aqueous solution of Aliphatic Ester Sulphate (i. e. oil ester sulphate) and 8.5 parts of an aqueous solution which contained 1 per cent by weight of Aquarex D (i. e. the mono-sodium sulphate ester of a mixture of higher fatty alcohols, principally lauryl and myristic alcohols), 1 per cent of Santomerse No. 3 (i. e. an alkali metal salt of dodecyl benzene sulphonate), 0.5 per cent of sodium bicarbonate and 0.15 per cent of potassium persulphate. The mixture was agitated to effect emulsification and the emulsion was heated with agitation in a closed container at 60° C. for approximately 20 hours, whereby polymerization was effected. The container was then opened and the polymerization product was coagulated by adding an aqueous calcium chloride solution. The product was separated from the liquor, washed with water and dried under vacuum. The product is a non-tacky rubbery substance which may be compounded with usual rubber-compounding agents, e. g. carbon black, sulphur, etc., and cured to obtain a vulcanized rubbery product having good mechanical properties, e. g. high tensile strength and elasticity, and possessing exceptional resistance to wear by abrasion.

Example 3

In each of a series of experiments 100 parts by weight of the unvulcanized non-tacky rubber-like co-polymer prepared as in Example 2 were treated with different proportions of the tacky, cyclohexanone-soluble co-polymer product of Example 1 and with 40 parts of carbon black, 5 parts of zinc oxide, 2 parts of sulphur, 1 part of mercapto-benzothiazole, 1 part of stearic acid, and 20 parts of dibutyl sebacate and the resultant mixture was worked on compounding rolls until substantially homogeneous. In the following table, the proportion of the tacky type of co-polymer used in the mixture is expressed as per cent of the combined weight of the two co-polymers. The resultant mixture was examined for tackiness, the test being to press two pieces of such mass together in the hands and then pull them apart. If the pieces pressed together adhered tightly and resisted separation they were regarded as tacky. The tacky masses may be pressed or worked onto a cotton fabric and vul- It will be noted that the addition to the non-tacky type of co-polymer of the tacky type of co-polymer in the proportions necessary to render the resultant mass tacky did not seriously impair any of the physical properties of the mass when compounded and cured and that it improved certain of the properties. However, the use of as much as 23 per cent of the tacky type of co-polymer did not result in the formation of a satisfactorily tacky mass and did weaken the product obtained by compounding and curing the mass. For these reasons, we employ not more than 25 per cent, and preferably from 8 to 20 per cent, of the tacky type of copolymer together with the non-tacky type of co-polymer.

Example 4

A series of experiments similar to those described in Example 3 were carried out, except that the non-tacky type of co-polymer employed in these experiments was a copolymer of butadiene, methyl isopropenyl ketone and styrene in the proportions of approximately 40 per cent by weight of butadiene, 30 per cent of methyl isopropenyl ketone and 30 per cent of styrene. The tacky type of co-polymer was prepared as described in Example 1. The mixture of copolymers was compounded as in Example 3. Table II gives the per cent by weight of the tacky type of co-polymer in the mixture of the same with the non-tacky type of co-polymer, states whether the compounded, but uncured, mass was tacky, and gives the tensile strength, the per cent elongation value and the Shore durometer hardness of the product after it was compounded and cured as in Example 3.

*Table II*

| Run No. | Percent of tacky co-polymer | Uncured compounded mass | Cured product | | |
|---|---|---|---|---|---|
| | | | Tensile strength lbs./sq. in. | Percent elongation | Hardness |
| 1 | 9 | Tacky | 2,920 | 450 | 62 |
| 2 | 17 | ...do... | 2,220 | 490 | 60 |
| 3 | 23 | ...do... | 2,000 | 560 | 56 |

Example 5

Another series of experiments similar to those described in Example 3 were carried out, except that the non-tacky type of co-polymer was composed of 50 per cent by weight of butadiene, 45 per cent of methyl isopropenyl ketone and 5 per cent of styrene. Table III gives the per cent by weight of the tacky co-polymer product of Example 1, based on the combined weight of the tacky and the non-tacky copolymers, in the compounded mass, states whether the compounded, but uncured, mass was tacky, and gives the tensile strength, the per cent elongation value and the Shore durometer hardness of the compounded and cured product.

Table III

| Run No. | Percent of tacky co-polymer | Uncured compounded mass | Cured product | | |
|---|---|---|---|---|---|
| | | | Tensile strength lbs./sq. in. | Percent elongation | Hardness |
| 1 | 9 | Tacky | 2,470 | 460 | 60 |
| 2 | 17 | Very tacky | 2,100 | 490 | 58 |
| 3 | 23 | ---do--- | 1,610 | 500 | 50 |

Other modes of applying the principle of the invention may be employed instead of those described, change being made as regards the method or compositions herein disclosed, provided the steps or ingredients stated by any of the following claims or the equivalent of such stated step or steps be employed.

We therefore particularly point out and distinctly claim as our invention:

1. A tacky rubber-like composition comprising from 75 to 95 per cent by weight of a non-tacky rubber-like co-polymer and from 5 to 25 per cent of a tacky, cyclohexanone-soluble co-polymer, based on the combined weight of the co-polymers, each of which co-polymers is composed, in chemically combined form, of from 37 to 65 per cent of an aliphatic conjugated diolefine, from 1 to 30 per cent of a 2-aryl-1-alkene, and from 20 to 60 per cent of an unsaturated ketone having the general formula:

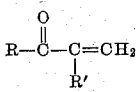

wherein R represents an alkyl radical and R' represents a member of the group consisting of hydrogen and alkyl radicals, the above-mentioned tacky cyclohexanone-soluble co-polymer being one formed by co-polymerizing the corresponding polymerizable monomeric compounds while in an aqueous emulsion thereof which is of a pH value below 3 and which contains an iron salt and a peroxide, and the non-tacky rubber-like co-polymer component of the composition being one prepared by co-polymerizing the corresponding polymerizable monomeric compounds under conditions other than those just specified for formation of the tacky co-polymer component.

2. A tacky rubber-like composition comprising from 80 to 92 per cent by weight of a non-tacky rubber-like co-polymer and from 8 to 20 per cent of a tacky, cyclohexanone-soluble co-polymer, based on the combined weight of the co-polymers, each of which co-polymers is composed, in chemically combined form, of from 37 to 65 per cent of butadiene-1.3, from 1 to 30 per cent of a 2-aryl-1-alkene, and from 20 to 60 per cent of an unsaturated ketone having the general formula:

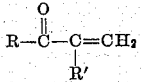

wherein R represents an alkyl radical and R' represents a member of the group consisting of hydrogen and alkyl radicals, the above-mentioned tacky cyclohexanone-soluble co-polymer being one formed by co-polymerizing the corresponding polymerizable monomeric compounds while in an aqueous emulsion thereof which is of a pH value below 3 and which contains an iron salt and a peroxide, and the non-tacky rubber-like co-polymer component of the composition being one prepared by co-polymerizing the corresponding polymerizable monomeric compounds under conditions other than those just specified for formation of the tacky co-polymer component.

3. A tacky rubber-like composition comprising from 80 to 92 per cent by weight of a non-tacky rubber-like co-polymer and from 8 to 20 per cent of a tacky, cyclohexanone-soluble co-polymer, based on the combined weight of the co-polymers, each of which co-polymers is composed, in chemically combined form, of from 37 to 65 per cent of butadiene-1.3, from 1 to 30 per cent of a 2-aryl-1-alkene, and from 20 to 60 per cent of methyl isopropenyl ketone, the above-mentioned tacky cyclohexanone-soluble co-polymer being one formed by co-polymerizing the corresponding polymerizable monomeric compounds while in an aqueous emulsion thereof which is of a pH value below 3 and which contains an iron salt and a peroxide, and the non-tacky rubber-like co-polymer component of the composition being one prepared by copolymerizing the corresponding polymerizable monomeric compounds under conditions other than those just specified for formation of the tacky copolymer component.

4. A tacky rubber-like composition comprising from 80 to 92 per cent by weight of a non-tacky rubber-like co-polymer and from 8 to 20 per cent of a tacky, cyclohexanone-soluble co-polymer, based on the combined weight of the co-polymers, each of which co-polymers is composed, in chemically combined form, of from 37 to 65 per cent of butadiene-1.3, from 1 to 30 per cent of styrene, and from 20 to 60 per cent of methyl isopropenyl ketone, the above-mentioned tacky cyclohexanone-soluble co-polymer being one formed by co-polymerizing the corresponding polymerizable monomeric compounds while in an aqueous emulsion thereof which is of a pH value below 3 and which contains an iron salt and a peroxide, and the non-tacky rubber-like co-polymer component of the composition being one prepared by co-polymerizing the corresponding polymerizable monomeric compounds other than those just specified for formation of the tacky co-polymer component.

5. The composition of claim 1 when vulcanized.
6. The composition of claim 2 when vulcanized.
7. The composition of claim 3 when vulcanized.
8. The composition of claim 4 when vulcanized.

ROBERT R. DREISBACH.
EDGAR C. BRITTON.
WALTER J. LE FEVRE.